(12) United States Patent
Inami et al.

(10) Patent No.: US 10,549,377 B2
(45) Date of Patent: Feb. 4, 2020

(54) WELDING ASSISTANCE MEMBER AND SPOT-WELDING METHOD USING WELDING ASSISTANCE MEMBER

(71) Applicant: Fuji Jukogyo Kabushiki Kaisha, Tokyo (JP)

(72) Inventors: Akiko Inami, Tokyo (JP); Keiji Nakamura, Tokyo (JP); Noboru Sakamoto, Sakamoto (JP); Wataru Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/008,357

(22) Filed: Jan. 27, 2016

(65) Prior Publication Data
US 2016/0243643 A1    Aug. 25, 2016

(30) Foreign Application Priority Data

Feb. 25, 2015   (JP) ................. 2015-034848

(51) Int. Cl.
*B23K 11/11*   (2006.01)
*B23K 11/16*   (2006.01)
(52) U.S. Cl.
CPC ............ *B23K 11/115* (2013.01); *B23K 11/16* (2013.01)
(58) Field of Classification Search
CPC .......... Y02E 30/40; B21D 53/88; B23P 15/00
(Continued)

(56) References Cited

U.S. PATENT DOCUMENTS

2007/0124908 A1* 6/2007 Takeuchi ............... B62D 25/20
                                                                29/428
2014/0294489 A1* 10/2014 Sakai .................... B62D 25/02
                                                                403/267
2016/0123362 A1   5/2016 Iwase

FOREIGN PATENT DOCUMENTS

JP      H05-142055 A    6/1993
JP      2014-104502 A   6/2014
WO      WO 2015/012058 A1   1/2015

OTHER PUBLICATIONS

JPO Decision to Grant dated Oct. 18, 2016 with JPO Website computer-generated English translation.
(Continued)

*Primary Examiner* — Tu B Hoang
*Assistant Examiner* — Thomas J Ward
(74) *Attorney, Agent, or Firm* — McGinn I.P. Law Group, PLLC.

(57) ABSTRACT

A welding assistance member with electrically-conductive properties is used for spot-welding performed by sandwiching a second member between electrically-conductive first members different in material from the second member. The welding assistance member is fitted into a hole extending through the second member so as to allow for spot-welding of the first members to each other from opposite sides in the hole. The welding assistance member includes: a main body that has a size and shape that allow a gap to be formed between the main body and an inner side surface of the hole when the main body is fitted in the hole; and a position maintaining component that is provided at an outer side of the main body, has heat, heat resisting, and electrically insulating properties, and maintains the main body in a separated state from the inner side surface. A spot-welding method uses this welding assistance member.

2 Claims, 4 Drawing Sheets

(58) Field of Classification Search
USPC .......... 29/428; 156/79; 428/122; 219/57, 58
See application file for complete search history.

(56) References Cited

OTHER PUBLICATIONS

JPO Notification of Refusal dated Jul. 19, 2016 with JPO Website computer-generated English translation.
Japanese Office Action dated Jul. 19, 2016 with an English translation thereof.

* cited by examiner

WELDING ASSISTANCE MEMBER AND SPOT-WELDING METHOD USING WELDING ASSISTANCE MEMBER

CROSS-REFERENCE TO RELATED APPLICATIONS

The present application claims priority from Japanese Patent Application No. 2015-034848 filed on Feb. 25, 2015, the entire contents of which are hereby incorporated by reference.

BACKGROUND

1. Technical Field

The present invention relates to welding assistance members and spot-welding methods using such welding assistance members. In particular, the present invention relates to a welding assistance member and a spot-welding method using such a welding assistance member employed when joining together different kinds of materials by spot-welding.

2. Related Art

When performing spot-welding by sandwiching a member between two electrically-conductive members, which are composed of a material different from that of the sandwiched member, there is a known technology that involves forming a hole extending through the sandwiched member, fitting a welding assistance member composed of an electrically-conductive material similar to that of the two electrically-conductive members into the hole, and performing spot-welding from opposite sides in the area of the hole.

SUMMARY OF THE INVENTION

In this type of spot-welding, since the hole fitted with the welding assistance member is sandwiched by the two electrically-conductive members, the fitted state of the welding assistance member set within the hole, that is, the fitted position, cannot be checked. Therefore, if the welding assistance member is not set at the center of the hole or if the welding assistance member set at the center of the hole positionally moves during the process, the spot-welding process may be not performed at the center of the welding assistance member, thus causing fusion to occur at a deviated position. This may result in reduced rigidity after the welding process, thus leading to loss of accuracy.

Japanese Unexamined Patent Application Publication (JP-A) No. 2014-104502 relates to a technology made in view of the above circumstances and discusses a spot-welding method that involves fitting and caulking the welding assistance member to the hole extending through the sandwiched member. According to this technology, a pair of plate-shaped members composed of iron as the main constituent are stacked on opposite surfaces of the plate-shaped sandwiched member composed of the different kind of material having the welding assistance member fitted and caulked therein, and spot-welding is performed from opposite sides in the area of the hole. Thus, the welding assistance member is positionally made stable within the hole, and spot-welding is performed in this stable state. Consequently, the welding process is performed accurately without deviation.

However, in the technology according to JP-A No. 2014-104502, the electrically-conductive welding assistance member is directly in contact with the sandwiched member. The following problem occurs especially when this technology is applied using carbon fiber reinforced plastic (referred to as "CFRP" hereinafter) as the sandwiched member. When spot-welding is performed in the above-described state, resistance heat generated when the two members and the welding assistance member are supplied with electricity is transmitted to the sandwiched member directly in contact therewith. This may cause the sandwiched member to break by, for example, being ignited or to receive the electricity. In that case, the quality of welding may possibly deteriorate.

It is desirable to provide a welding assistance member and a spot-welding method using the welding assistance member that can avoid degradation of jointing members while achieving stable installation of the welding assistance member.

A first aspect of the present invention provides a welding assistance member that is used for spot-welding performed by sandwiching a second member between electrically-conductive first members composed of a different kind of material from the second member. The welding assistance member is fitted into a hole extending through the second member so as to allow for spot-welding of the first members to each other from opposite sides in an area of the hole. The welding assistance member includes a main body and a position maintaining component. The main body is composed of an electrically-conductive material and has a size and shape that allow a gap to be formed between the main body and an inner side surface of the hole when the main body is fitted in the hole. The position maintaining component is provided at an outer side of the main body, has heat insulating, heat resisting, and electrically insulating properties, and maintains the main body in a separated state from the inner side surface of the hole.

The position maintaining component may be formed of a foam component.

A second aspect of the present invention provides a spot-welding method that uses the welding assistance member according to the first aspect. The spot-welding method includes: hole forming that forms a hole extending through the second member; foaming-agent providing that provides a non-foamed foaming agent at an outer side of the main body; fitting that stacks the second member having the hole onto one of the first members and fits the main body having the non-foamed foaming agent on the outer side of the main body into the hole; sandwiching that sandwiches the welding assistance member by stacking the other first member onto an upper surface of the second member fitted with the main body having the non-foamed foaming agent on the outer side of the main body; and welding that applies electric current to the first members sandwiching the second member in a state where the first members are sandwiched and pressed from opposite sides in a stacking direction by electrodes, and fusion-bonds the first members to each other while simultaneously forming a foam component by causing the non-foamed foaming agent to foam in accordance with heat generated as a result of the applied electric current.

DETAILED DESCRIPTION

A welding assistance member according to an example of the present invention will be described below with reference to the drawings.

Figure 1A:
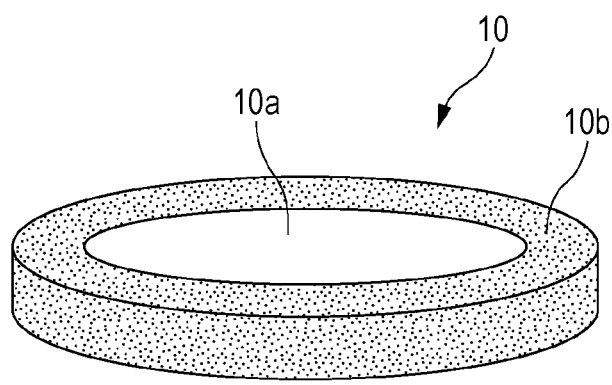
FIG. 1A is a perspective view of a welding assistance member according to an example of the present invention.
Figure 1B:
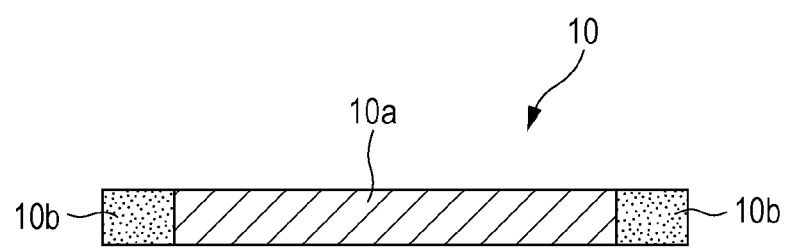
FIG. 1B is a cross-sectional view of the welding assistance member, taken in the thickness direction thereof.

FIGS. 1A and 1B illustrate the configuration of a welding assistance member 10 according to an example of the present invention. Specifically, FIG. 1A is a top perspective view, and FIG. 1B is a cross-sectional view taken in the thickness direction. In this example, the welding assistance member 10 is constituted of a substantially disk-shaped main body 10a and a foam component 10b as a position maintaining component attached around the outer side surface of the main body 10a. The main body 10a is composed of an electrically-conductive material, such as a metallic material with iron as the main constituent. In this example, the main body 10a is composed of the same kind of material as first members 12-1 and 12-2. In this example, the main body 10a has an outside diameter of about 10 mm. The thickness of the main body 10a is set substantially equal to the thickness of a second member 14 to be described later. The material used for the foam component 10b is synthetic resin foam having heat insulating, heat resisting, and electrically insulating properties and is selected in accordance with various conditions, such as the melting point of the first members 12-1 and 12-2.

Figure 2A:
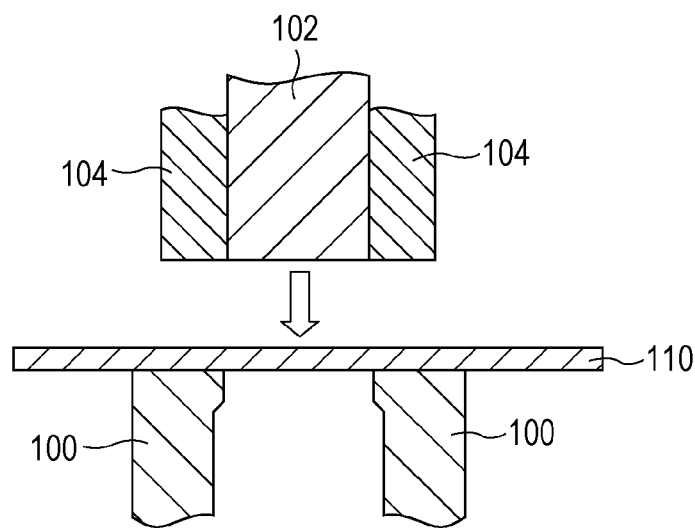
FIG. 2A illustrates a method for manufacturing a main body and illustrates a state thereof before a punching process, and FIG. 2B similarly illustrates the method for manufacturing the main body and illustrates a state thereof after the punching process.
Figure 2B:
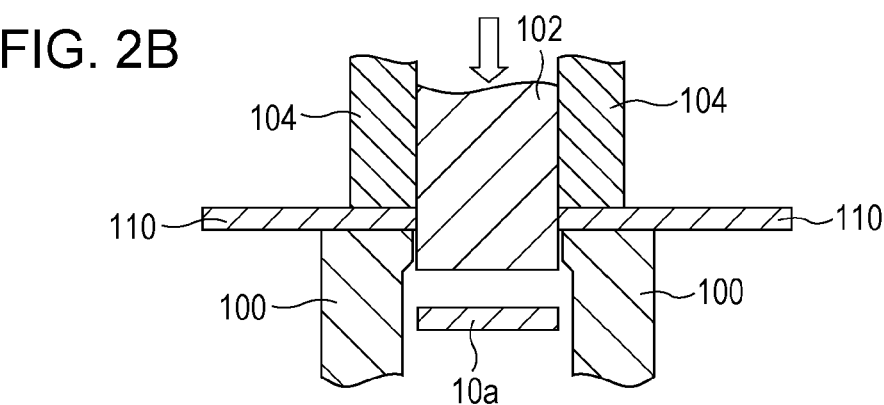

FIGS. 2A and 2B illustrate a prerequisite process for manufacturing the welding assistance member 10. Specifically, FIG. 2A illustrates a method for manufacturing the main body 10a and illustrates a state thereof before a punching process, and FIG. 2B similarly illustrates the method for manufacturing the main body 10a and illustrates a state thereof after the punching process. For instance, as illustrated in FIG. 2A, a plate-shaped material 110 used for manufacturing the main body 10a and composed of the same kind of material as the first members 12-1 and 12-2 is set on a hole-punching base 100, and a puncher 102 is lowered together with a guide 104. Then, as illustrated in FIG. 2B, a punching process is performed on the plate-shaped material 110 by using the puncher 102, thereby forming the main body 10a.

Figure 3:
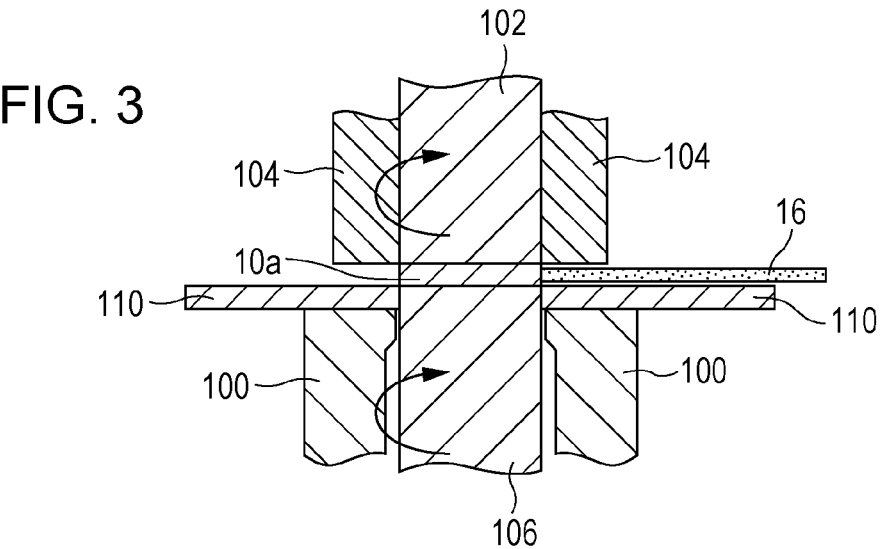
FIG. 3 illustrates a method for wrapping a foam tape around the main body.

FIG. 3 illustrates a method for wrapping a foam tape 16 around the aforementioned main body 10a formed by punching. A vertically-movable cradle 106 is set in the central area of the hole-punching base 100. When the aforementioned main body 10a formed by punching drops downward, the upper end surface of the cradle 106 receives the main body 10a. By raising the cradle 106 with the main body 10a placed thereon, the main body 10a becomes sandwiched from opposite sides by the cradle 106 and the puncher 102. With the main body 10a in the sandwiched state, the main body 10a is fixed at a position higher than the upper surface of the plate-shaped material 110.

Then, in this state, the main body 10a is rotated by rotating the puncher 102 and the cradle 106 together in the same circumferential direction. While rotating the main body 10a, the foam tape 16 is wrapped around and attached to the outer side surface of the main body 10a. Although this example relates to a case where the foam tape 16 is wrapped and attached, a foaming agent may alternatively be applied onto the main body 10a. By heating the foam tape 16 to cause the foam tape 16 to foam, the foam component 10b is formed, whereby the welding assistance member 10 according to this example can be manufactured.

A spot-welding method according to an example of the present invention using the welding assistance member 10 will be described below with reference to FIGS. 4A to 6.

The spot-welding method according to this example involves sandwiching the second member 14 between two electrically-conductive first members 12-1 and 12-2, which are composed of a different kind of material from the second member 14, and ultimately spot-welding the members together. Each of the first members 12-1 and 12-2 is composed of, for instance, an electrically-conductive material with iron as the main constituent and is a plate-shaped metallic member with a thickness of about 0.5 mm. The second member 14 is composed of carbon fiber reinforced plastic (referred to as "CFRP" hereinafter) and is a plate-shaped member with a thickness of about 1.0 mm.

First, a hole 18, which is a cylindrical through-hole, is formed in each welding location of the second member 14. The inside diameter of the hole 18 is about 14 mm. In one example of the present invention, this process may serve as a "hole forming".

Figure 4A:
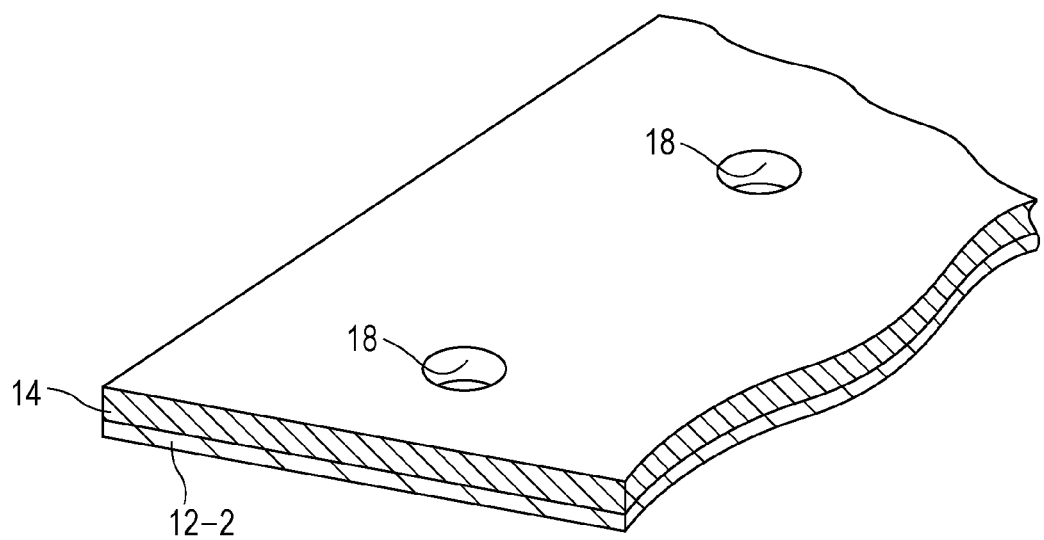
FIG. 4A illustrates a method for fitting a non-foamed welding assistance member into a hole in a second member stacked on a first member and illustrates a pre-fitted state of the non-foamed welding assistance member, and FIG. 4B similarly illustrates the method for fitting the non-foamed welding assistance member into the hole and illustrates a fitted state of the non-foamed welding assistance member.
Figure 4B:
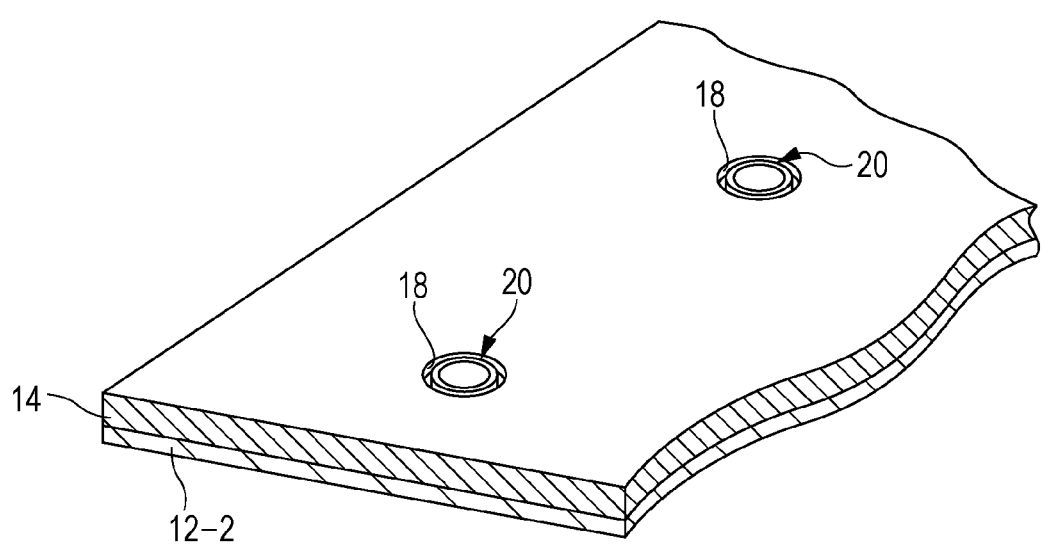

FIG. 4A illustrates a state where the second member 14 preliminarily having the holes 18 formed therein as described above is stacked on the first member 12-2. FIG. 4B illustrates a state where a member (which will be referred to as "non-foamed welding assistance member 20" hereinafter) obtained by wrapping and attaching the foam tape 16 around the outer side surface of the aforementioned main body 10a is fitted into each hole 18 in the above-described state. The manufacturing of the non-foamed welding assistance member 20 is as described above. In one example of the present invention, this process may serve as a "foaming-agent providing".

In this state, the outside diameter of the non-foamed welding assistance member 20 is smaller than the inside diameter of the hole 18. Therefore, this fitting process can be performed readily. In one example of the present invention, this process may serve as a "fitting".

Figure 5A:
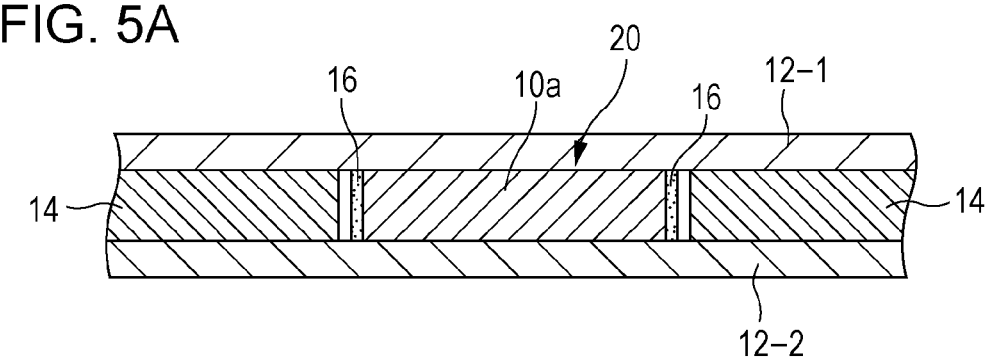
FIG. 5A is a partial cross-sectional view illustrating a method for stacking a first member onto the upper surface of the second member fitted with the non-foamed welding assistance member so as to sandwich the non-foamed welding assistance member.

FIG. 5A illustrates a state where the non-foamed welding assistance member 20 (see FIG. 4B) is fitted in the hole 18, and the first member 12-1 is stacked on the upper surface of the second member 14. In one example of the present invention, this process may serve as a "sandwiching".

Figure 5B:
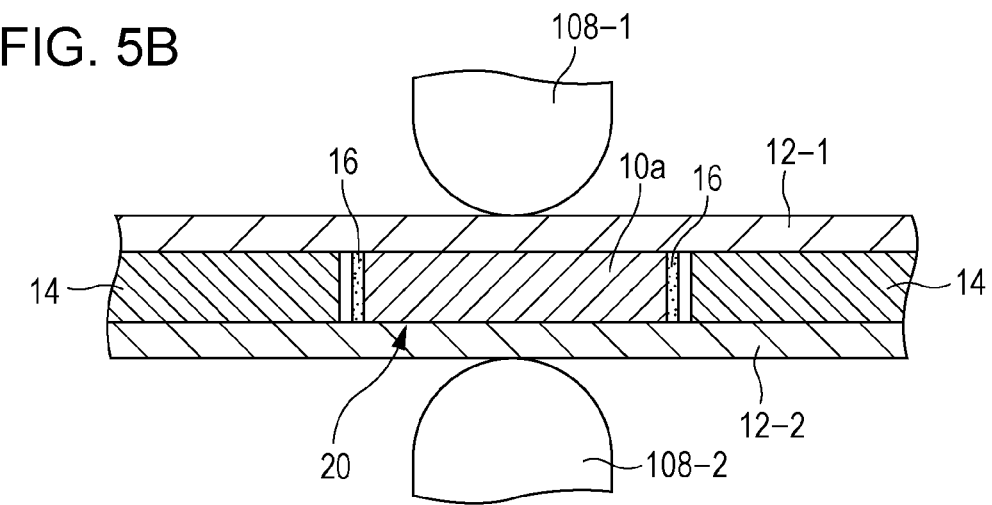
FIG. 5B is a partial cross-sectional view illustrating a method for fusion-bonding jointing members together and illustrates a pre-electrified state.
Figure 6:
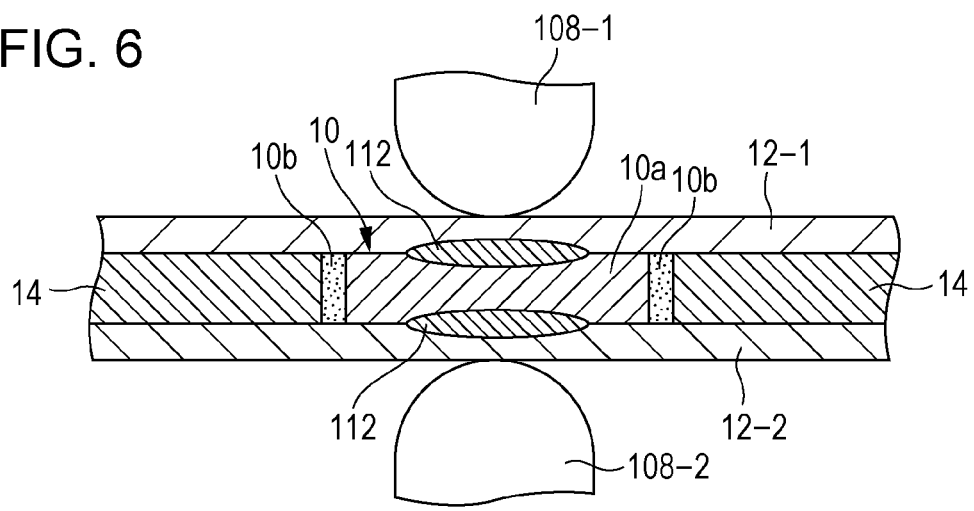
FIG. 6 is a partial cross-sectional view illustrating a method for causing a foam tape to foam simultaneously with fuse-bonding of the jointing members.

FIGS. 5B and 6 illustrate a state where the jointing members are being fusion-bonded. First, as illustrated in FIG. 5B, the aforementioned jointing members are pressed at the central position of the hole 18, which is fitted with the non-foamed welding assistance member 20, in a state where the jointing members are sandwiched from opposite sides by two electrodes 108-1 and 108-2 in the stacking direction. By applying electric current in this state, resistance heat is generated on the main body 10a, so that fusing of the first members 12-1 and 12-2 and the main body 10a begins.

This example is characterized in that the foam tape 16 wrapped around the outer side of the main body 10a is heated by utilizing the aforementioned resistance heat so as to cause the foam tape 16 to foam.

FIG. 6 illustrates a method for causing the foam tape 16 to foam simultaneously with fuse-bonding of the jointing members. The foam tape 16 foams within a gap between the main body 10a and the inner side surface of the hole 18 so as to fill the gap between the main body 10a and the inner side surface of the hole 18. Thus, the foam component 10b can be readily formed without having to provide an additional process for forming a foam component, and the main body 10a can be maintained in a separated state from the inner side surface of the hole 18. Moreover, the foam component 10b has high heat resisting properties due to having pores, so as to reduce transmission of resistance heat generated at the main body 10a to the second member 14. Consequently, degradation in quality of the second member 14 caused by a temperature rise can be prevented.

The material of the foam component 10b is prepared to have enough heat resisting properties to prevent it from being ignited by heat generated during spot-welding.

Furthermore, because the foam component 10b has electrically insulating properties, the foam component 10b can prevent electric current from flowing distributively to the second member 14 while electricity is being applied to the main body 10a. The first members 12-1 and 12-2 and the main body 10a are fused in this state, and the fused areas solidify and become nuggets 112, so that the jointing members can be joined together. In one example of the present invention, this process may serve as a "welding". Consequently, spot-welding can be performed stably with high quality without degrading the quality of the second member 14.

The present invention is not limited to the scope defined in the above example, and various modifications are possible within the scope of the invention. For instance, although the foam tape 16 is caused to foam within the hole 18 by utilizing heat generated during spot-welding in this example, the foam component 10b in a preliminarily foamed state may be attached to the main body 10a and be fitted into the hole 18.

Furthermore, although the foam component 10b is described as an example of the position maintaining component, various kinds of materials may be used so long as the material used has heat insulating, heat resisting, and electrically insulating properties and can be fitted in the gap between the main body 10a and the inner side surface of the hole 18.

Furthermore, although the foam component 10b as the position maintaining component is provided around the entire outer side surface of the substantially disk-shaped main body 10a in this example, the main body 10a is not limited to the substantially disk shape and may have various shapes so long as the main body 10a has a size that can be fitted within the hole 18. Moreover, although the position maintaining component is formed around the entire outer side surface of the main body 10a, the position maintaining component may be partially provided at the outer side of the main body 10a so long as the main body 10a can be stably positioned within the hole 18.

The invention claimed is:

1. A spot-welding method for spot welding performed by sandwiching between a first electrode and a second electrode using a welding assistance member that has electrically-conductive properties and is used for spot-welding performed by sandwiching a non-electrically-conductive member between a first electrically-conductive member disposed on a side in contact with the first electrode during welding and a second electrically-conductive member disposed on a side in contact with the second electrode during welding and composed of a different kind of material from the non-electrically-conductive member, the welding assistance member being fitted into a hole extending through the non-electrically-conductive member so as to allow for spot-welding of the first electrically-conductive member and the second electrically-conductive member to each other including the non-electrically-conductive member from opposite sides in an area of the hole, the welding assistance member including:

a main body that is made from a plate-shaped material being smaller than an inside size of the hole and has a size and shape that allow a gap extending in an axial direction of the first electrode and the second electrode used during spot welding and formed between the main body in a plane direction and an inner side surface of the hole of the non-electrically-conductive member when the main body is fitted in the hole, and a thickness of the main body is formed equal to the thickness of a second member, and the main body is held between the first electrically-conductive member and the second electrically-conductive member in the axial direction of the first electrode and the second electrode; and a position maintaining component surrounding an outer periphery of the main body; comprises a non-foamed foaming agent configured to foam in accordance with heat generated during the spot-welding, and, after foaming, has heat insulating, heat resisting, and electrically insulating properties to maintain the main body in a separated state from the inner side surface of the hole and from the non-electrically-conductive member of equal thickness to the main body, the spot-welding method comprising:

hole forming that forms the hole extending through the non-electrically-conductive member;

foaming-agent that provides for providing a non-foamed foaming agent at an outer side of the main body, a thickness of the main body is formed equal to the thickness of the non-electrically-conductive member;

fitting that stacks the non-electrically-conductive member having the hole onto one of the first electrically-conductive member and the second electrically-conductive member and fits the main body having the non-foamed foaming agent on the outer side of the main body into the hole;

sandwiching that sandwiches the welding assistance member by stacking the first electrically-conductive member onto an upper surface of the second electrically-conductive member fitted with the main body having the non-foamed foaming agent on the outer side of the main body; and welding that applies electric current to the first electrically conductive member and the second electrically-conductive member sandwiching the non-electrically-conductive member in a state where the first electrically-conductive member and the second electrically-conductive member are sandwiched and pressed from opposite sides in a stacking direction by the first electrode and a second electrode and fusion-bonds the first electrically-conductive member and the second electrically-conductive member to each other by forming the nugget connecting each of the first electrically-conductive member and the second electrically-conductive member to the main body to cause a force to sandwich the non-electrically-conductive member between the first electrically-conductive member and the second electrically-conductive member while simultaneously thrilling a foam component by causing the non-foamed foaming agent to foam in accordance with heat generated as a result of the applied electric current from the welding to keep the main body in a separated state from the non-electrically-conductive member of equal thickness to the main body.

2. A spot-welding method for spot welding performed by sandwiching between a first electrode and a second electrode using a welding assistance member that has electrically-conductive properties and is used for spot-welding performed by sandwiching a non-electrically-conductive member between a first electrically-conductive member disposed on a side in contact with the first electrode during welding and a second electrically-conductive member disposed on a side in contact with the second electrode during welding and composed of a different kind of material from the non-electrically-conductive member, the welding assistance member being fitted into a hole extending through the non-electrically-conductive member so as to allow for spot-welding of the first electrically-conductive member and the second electrically-conductive member to each other including the non-electrically-conductive member from opposite sides in an area of the hole, the welding assistance member including:

a main body that is made from a plate-shaped material being smaller than an inside size of the hole and has a size and shape that allow a gap extending in an axial direction of the first electrode and the second electrode used during spot welding and formed between the main body in a plane direction and an inner side surface of the hole of the non-electrically-conductive member when the main body is fitted in the hole, and a thickness of the main body is formed equal to the thickness of a second member, and the main body is held between the first electrically-conductive member and the second electrically-conductive member in the axial direction of the first electrode and the second electrode; and a position maintaining component surrounding an outer periphery of the main body, comprises a non-foamed foaming agent configured to foam in accordance with heat generated during the spot-welding, and, after foaming, has heat insulating, heat resisting, and electrically insulating properties to maintain the main body in a separated state from the inner side surface of the hole and from the non-electrically-conductive member of equal thickness to the main body, the spot-welding method comprising:

forming a nugget between the main body and each of the first electrically-conductive member and the second electrically-conductive member in a region of the hole such that the first electrically-conductive member and the second electrically-conductive member are welded together to hold the non-electrically-conductive member therebetween;

pressing the first electrically-conductive member and the second electrically-conductive member and the second electrically-conductive member at a central position of the hole with sandwiching the welding assistance member consists of the main body and the position maintaining component by the first electrode and the second electrode of a spot welding device, and forming the position maintaining component outside of the main body by resistance heat generated by pressing fuses the first electrically-conductive member and the second electrically-conductive member and the main body forming a foam component by causing the non-foamed agent to foam in accordance with heat generated as a result of the applied electric current from the welding to keep the main body in a separated state from the non-electrically-conductive member of equal thickness to the main body.

\* \* \* \* \*